United States Patent [19]

Leblans et al.

[11] Patent Number: 5,367,176
[45] Date of Patent: Nov. 22, 1994

[54] PHOTOSTIMULABLE STORAGE PHOSPHOR AND ITS USE IN RADIOGRAPHY

[75] Inventors: Paul Leblans, Berchem,

[73] Assignee: AGFA-Gevaert, N.V., Mortsel,

[21] Appl. No.: 61,522

[22] Filed: May 17, 1993

[30] Foreign Application Priority Data

Jun. 10, 1992 [EP] European Pat. Off. ........ 92201688.6

[51] Int. Cl.$^5$ .................... G01N 23/04; C09K 11/71
[52] U.S. Cl. ................... 250/585; 250/484.4; 252/301.4 P; 252/301.4 F
[58] Field of Search ............ 252/301.4 P, 301.4 F; 250/484.4, 585; 428/690

[56] References Cited

U.S. PATENT DOCUMENTS 3,422,024  1/1969  McAllister .............. 252/301.4 P
4,353,808  10/1982  Tanimizu et al. ........... 252/301.4 P
4,507,379  3/1985  Tsuchino et al. .......... 252/301.4 P

*Primary Examiner*—Jack Cooper
*Attorney, Agent, or Firm*—Breiner & Breiner

[57] ABSTRACT

A photostimulable storage phosphor within the scope of following formula (I):

$$M_3(PO_4)_2:xEu^{2+}, yT^{3+}, zZr^{4+}$$

wherein: M is at least one of the alkaline earth metals selected from the group consisting of Ca, Sr and Ba, x corresponds with an atom fraction value $5 \times 10^{-5} \leq x \leq 10^{-1}$, y corresponds with an atom fraction value $0 \leq y \leq 10^{-1}$, $T^{3+}$ is at least one member selected from the group consisting of $La^{3+}$, $Lu^{3+}$, $Y^{3+}$ and $Gd^{3+}$, z corresponds with an atom fraction value $0 \leq z \leq 10^{-1}$, and $5 \times 10^{-5} \leq z+y \leq 10^{-1}$.

2 Claims, 5 Drawing Sheets

PHOTOSTIMULABLE STORAGE PHOSPHOR AND ITS USE IN RADIOGRAPHY

DESCRIPTION

1. Field of the Invention

This invention relates to a photostimulable alkaline earth orthophosphate phosphor and its use in a method of recording and reproducing an X-ray pattern by means of a binder layer containing said phosphor in a screen or panel.

2. Background of the Invention

It is well known that X-rays can cause appropriate substances to luminesce. Substances showing the phenomenon of luminescence under the influence of X-rays are called phosphors.

According to a classical method of recording and reproducing an X-ray pattern phosphors are used to form radiographs in conjunction with photographic silver halide emulsion materials being highly sensitive to the emitted fluorescent light.

The phosphors used in said screens should be luminescent but not exhibit appreciable long lived emission after the X-ray source is switched off. If a screen with marked-long lived emission were to be used, it would retain its image after the X-ray beach had ceased and fresh film contacted with it would gain a so-called ghost impression that would interfere with the next image to be made. This phenomenon being undesirable in the production of radiographs by contact exposure with a fluorescent X-ray conversion screen is known under the terms "after-glow" and "lag".

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a began of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

In published European patent application 0 102 238 a phosphate type phosphor is described having the composition $M_3(PO_4)_2$: yA, wherein M represents Mg, Ca, St, Ba, Zn or Cd, A is independently Eu, Tb, Ce, Tm, Dy, Pt, Ho, Nd, Yb, Er, Sb, Tl, Mn or Sn and y is a value satisfying the condition $0 \leq y \leq 1$. Said phosphor has been described for use in a method of converting a radiographic image by the steps of:

1) passing radiation through an object so as to be absorbed by a stimulable phosphor,
2) stimulating the phosphor by a stimulating ray of a wavelength not less than 500 run or infrared light to release radiation stored in the phosphor as fluorescent light, and
3) detecting the fluorescence to form an image.

As described in the periodical Radiology, September 1983, p. 834 the imaging plate containing the stimulable phosphor can be used repeatedly to store X-ray images simply by flooding it with light to erase the residual energy it contains.

In medical radiography it is important that the X-ray radiation dose is as low as possible, therefore an intensive research is still going on to find phosphors that have a highly efficient X-ray energy storage capacity and photostimulability.

SUMMARY OF THE INVENTION

It is an object of the present invention to provide novel europium doped alkaline earth orthophosphate phosphors showing through codoping an improved X-ray storage capacity and X-ray energy conversion efficiency.

It is a further object of the present invention to provide an X-ray panel containing said photostimulable phosphor dispersed in a binder layer.

It is another object of the present invention to provide a process for recording and reproducing X-ray patterns based on photostimulation of said phosphor following its exposure to imagewise or patternwise modulated X-ray irradiation.

Other objects and advantages of the present invention will become clear from the following description.

In accordance with the present invention a novel photostimulable storage phosphor is provided within the scope of following formula (I):

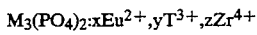
$$M_3(PO_4)_2 : xEu^{2+}, yT^{3+}, zZr^{4+}$$

wherein:
M is at least one of the alkaline earth metals selected from the group consisting of Ca, Sr and Ba,
x corresponds with an atom fraction value $5 \times 10^{-5} \leq x \leq 10^{-1}$,
y corresponds with an atom fraction value $0 \leq y \leq 10^{-1}$,
$T^{3+}$ is at least one member selected from the group consisting of $La^{3+}$, $Lu^{3+}$, $y^{3+}$ and $Gd^{3+}$,
z corresponds with an atom fraction value $0 \leq z \leq 10^{-1}$ and $5 \times 10^{-5} \leq z + y \leq 10^{-1}$.

Further in accordance with the present invention an X-ray screen or panel is provided containing said photostimulable phosphor dispersed in a binder layer.

Still further in accordance with the present invention a method for recording and reproducing an X-ray image is provided which comprises the steps of:

(1) causing a photostimulable phosphor to absorb image-wise or pattern-wise modulated X-rays,
(2) photostimulating said phosphor with stimulating electromagnetic radiation selected from visible light and infrared light to release from the phosphor in accordance with the absorbed X-rays electromagnetic radiation different in wavelength from the radiation used in the photo-stimulation, and
(3) detecting said electromagnetic radiation emitted by photostimulation, characterized in that said phosphor is a photostimulable phosphor within the scope of said formula (I).

DETAILED DESCRIPTION OF THE INVENTION

Figure 1:
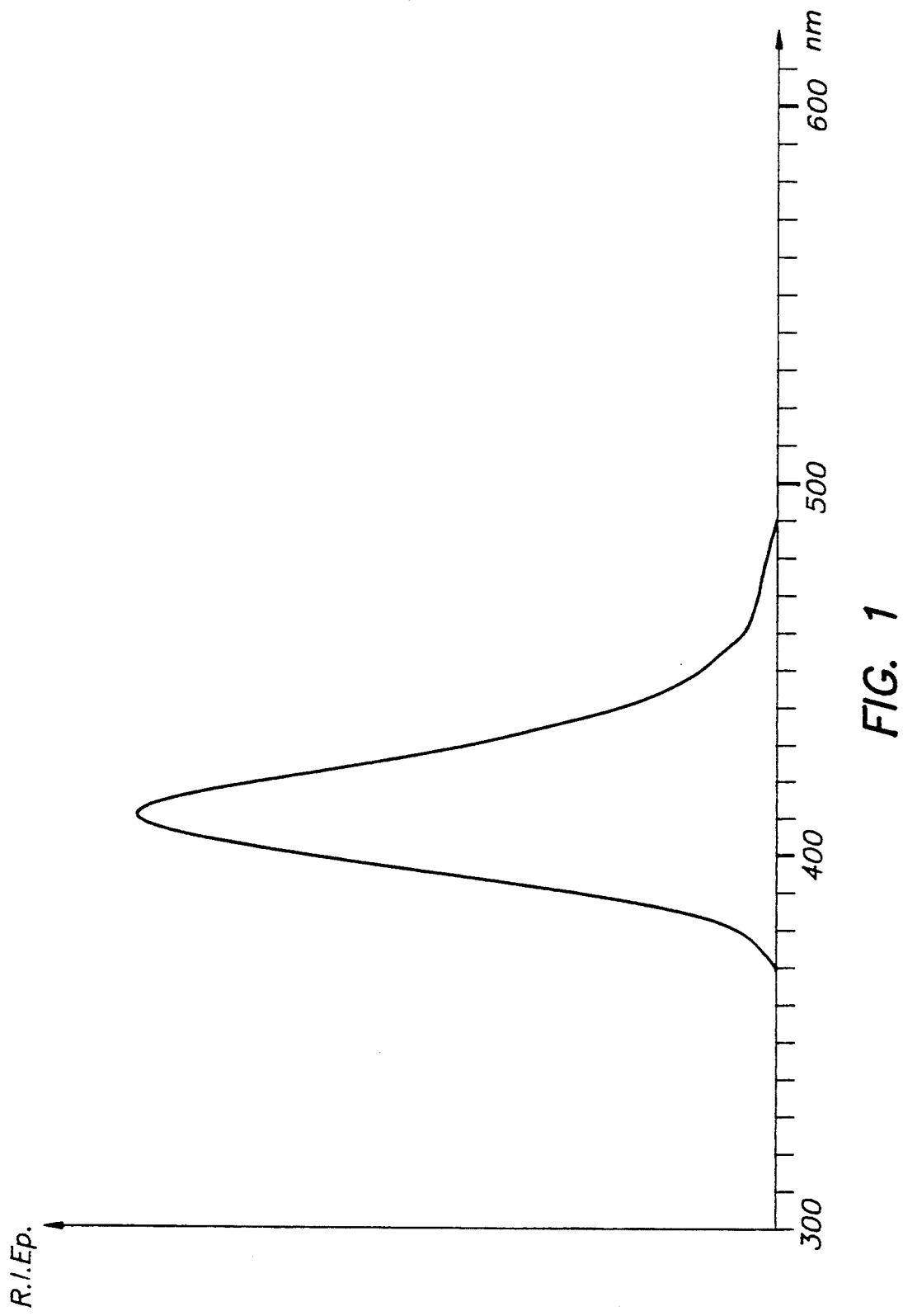
FIG. 1 represents a "prompt" emission spectrum of the fluorescent light emitted on X-ray irradiation of a phosphor according to the present invention. Said spectrum corresponds with the spectrum of the fluorescent light emitted on photostimulation. In the diagram the relative intensity of the prompt emission (R.I.E$_p$.) is in the ordinate and the wavelength of the stimulating light is in the abscissa in nm.

Preferred phosphors for use according to the above defined method are within the scope of the above formula (I) wherein:

M represents Ba and/or Sr, x corresponds with an atom fraction value $5 \times 10^{-5} \leq x \leq 10^{-1}$, more preferably $10^{-4} \leq x \leq 10^{-1}$, y corresponds with an atom fraction value $5 \times 10^{-5} \leq y \leq 10^{-1}$, more preferably $10^{-4} \leq y \leq 10^{-1}$, $T^{3+}$ is $La^{3+}$ or $Gd^{3+}$ and z corresponds with an atom fraction value $5 \times 10^{-5} \leq z \leq 10^{-1}$, more preferably $10^{-4} \leq z \leq 10^{-1}$.

The photostimulable phosphors suited for use according to the present invention can be prepared by firing mixtures of oxides or oxygen-containing salts of Ca, Sr and/or Ba such as carbonates, oxalates, nitrates and sulfates with an ammonium ortho- or hypophosphate in the presence of oxides and/or oxygen-containing salts of europium (Eu) and lanthanum (La), yttrium (Y), lutetium (Lu), gadolinium (Gd) and/or zirconium (Zr) for periods of up to 40 hours at temperatures between 500° and 1200° C., preferably in a reducing atmosphere. Optionally Eu and La can be incorporated while being coprecipitated with the selected alkaline earth element(s) represented by M in the above formula (I).

For use in the method according to the present invention the photostimulable phosphor according to formula (I) is preferably present in dispersed form in a binder layer that may be supported or self-supporting and forms a screen or panel called X-ray image storage panel.

The binder layer incorporates said phosphor in dispersed form preferably in (a) film forming organic polymer(s), e.g. a cellulose acetate butyrate, polyalkyl (meth) acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2.

The phosphors according to said formula (I) have a good moisture-resistivity so that no special measures have to be taken to protect them against hydrolysis as described e.g. in U.S. Pat. No. 3,023,313 and U.S. Pat. No. 4,138,361.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 mm to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles (rutile or anatase and other UV-reflecting pigments described in U.S. Pat. No. 3,023,313), or it may be made of a vapour-deposited metal layer, e.g. an aluminium layer, or it may be a coloured pigment layer absorbing stimulating radiation but reflecting the emitted stimulation light as described e.g. in U.S. Pat. No. 4,380,702.

According to an embodiment of the above defined method for recording and reproducing an X-ray image the photostimulation of the phosphor-binder layer that has been exposed image-wise or pattern-wise to X-rays proceeds with a scanning light beam, preferably a laser light beam, e.g. of He-Ne laser emitting at 633 nm, argon ion laser emitting at 514.5 run or 488 nm or frequency doubled Nd:YAG laser beam of 532 nm wavelength.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. a silver halide emulsion film whereon the X-ray image optionally is reproduced in image-processed state. For said embodiment and apparatus used therein reference is made e.g. to the periodical Radiology, September 1983, p. 833–838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On the phosphors of the present invention measurements have been carried out for determining their photo-physical properties.

First the emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filters are to be used in all the other measurements. A first filter transmits the emitted light obtained by photostimulation but filters out almost all of the stimulating light.

In the second measurement the total photostimulable energy stored upon exposure to a given X-ray dose is determined. Prior to X-ray excitation any residual energy still present in the phosphor screen is removed by irradiation with frequency doubled Nd:YAG laser light. The phosphor screen is then excited with an X-ray source operating at 85 kVp and 20 mA. For that purpose the MONODOR X-ray source of Siemens AG—W. Germany was used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The laser light used in these measurements was 488 nm or 514 nm light emitted by argon ion laser or frequency doubled Nd:YAG laser light (532 nm) or 633 nm laser light of He-Ne laser.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multiprogrammer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen the light emitted by only 7 mm$^2$ is collected. Only half of the laser power reaches the screen surface. In this way the intensity of the stimulating beam is more uniform. A red filter (3 mm SCHOTT OG 590) placed immediately in front of the laser eliminates the weak ultraviolet components in the laser emission. In case the argon ion laser light of 488 nm was used for photostimulation, a combination of a SCHOTT GG 455 and BG 39 filter was placed in front of the laser to remove both the weak ultraviolet and infrared components of the laser emission light.

The signal amplitude from the photomultiplier is linear with the intensity of the photostimulating light and with the stored photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $f(t) = A.e^{-t/\tau}$:

wherein A is the amplitude, is the time constant, t is stimulation time, and e is the base number of natural logarithms.

The 1/e point is reached when $t = \tau$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission is detected by the photomultiplier. After all these corrections have been made a conversion efficiency value (C.E.) is obtained in pJ/mm$^3$/mR. This value varies with screen thickness and therefore for measurements to be comparable they have to be carried out at constant phosphor coverage.

The stimulation energy is defined as the energy necessary to stimulate the release of 63 % of the stored energy and is expressed in $\mu J/mm^2$.

In a third measurement related to the determination of storage capacity the sample after irradiation with a particular dose of X-rays is heated at a constant rate and the intensity of the luminescence by the phosphor is measured as a function of temperature.

All measurements were performed at a heating rate of 10 K/min.

The present invention is illustrated by the following examples wherein reference is made to FIG. 1 to 5.

FIG. 1 represents the "prompt" emission spectrum of the phosphor described in Example 2 (invention example).

Figure 2:
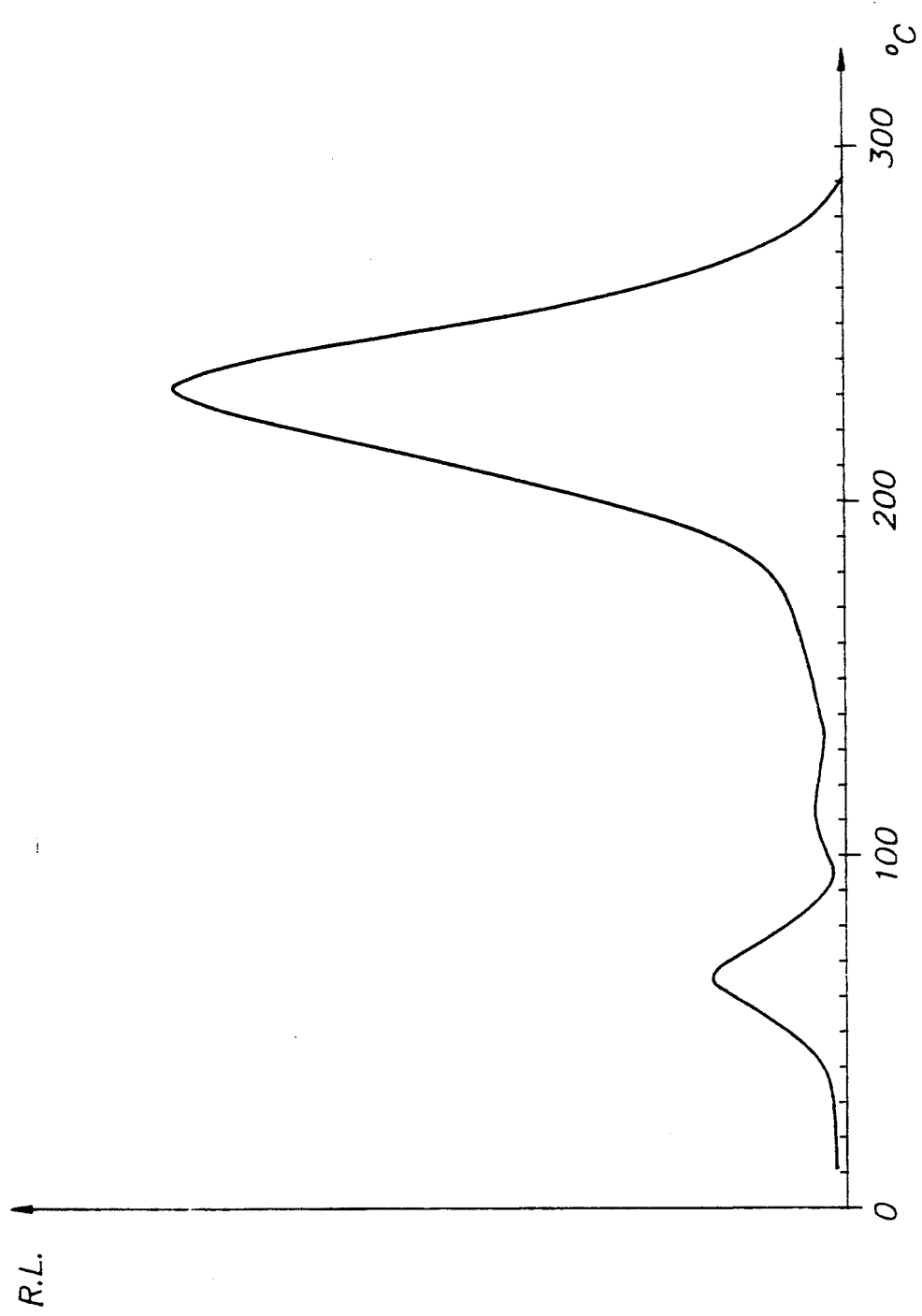
FIGS. 2 and 3–5 represent respectively graphs (glow-curves) related to the thermoluminescence, measured for the phosphor of Example 1, the comparative example phosphor solely doped with $Eu^{2+}$, and for the invention phosphors prepared according to Examples 2–4 which phosphors are codoped with one of the metal cations selected from the group consisting of $La^{3+}$, $Y^{3+}$ and $Lu^{3+}$. In these graphs the relative intensity of the thermally stimulated fluorescent light emission, relative luminance (R.L.), is plotted as a function of temperature in centigrades (°C.).

FIG. 2 represents the graph (glow-curve) related to the thermoluminescence measured on the prior art phosphor of Comparative Example 1, wherein the phosphor is doped solely with Eu.

Figure 3:
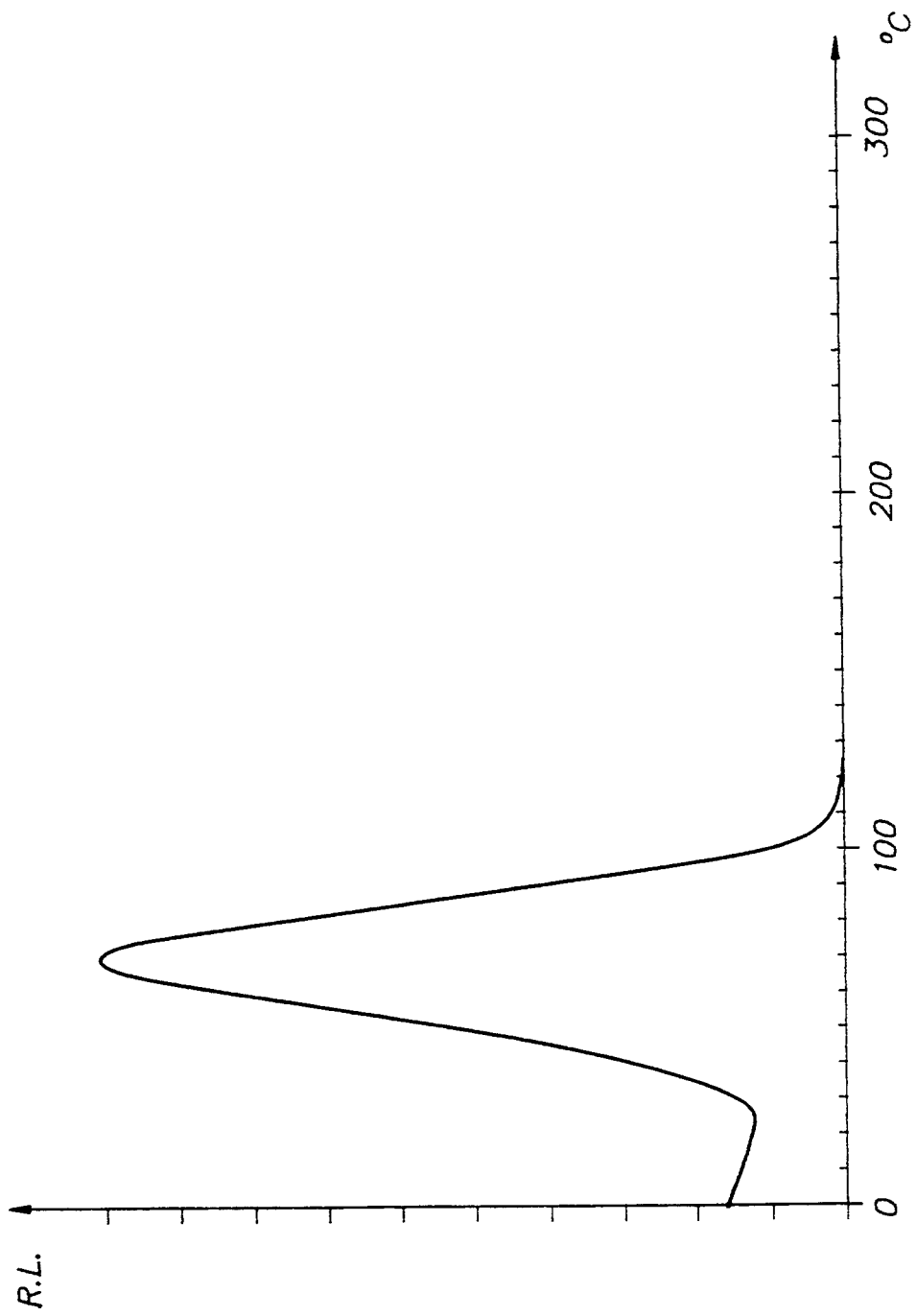
Figure 4:
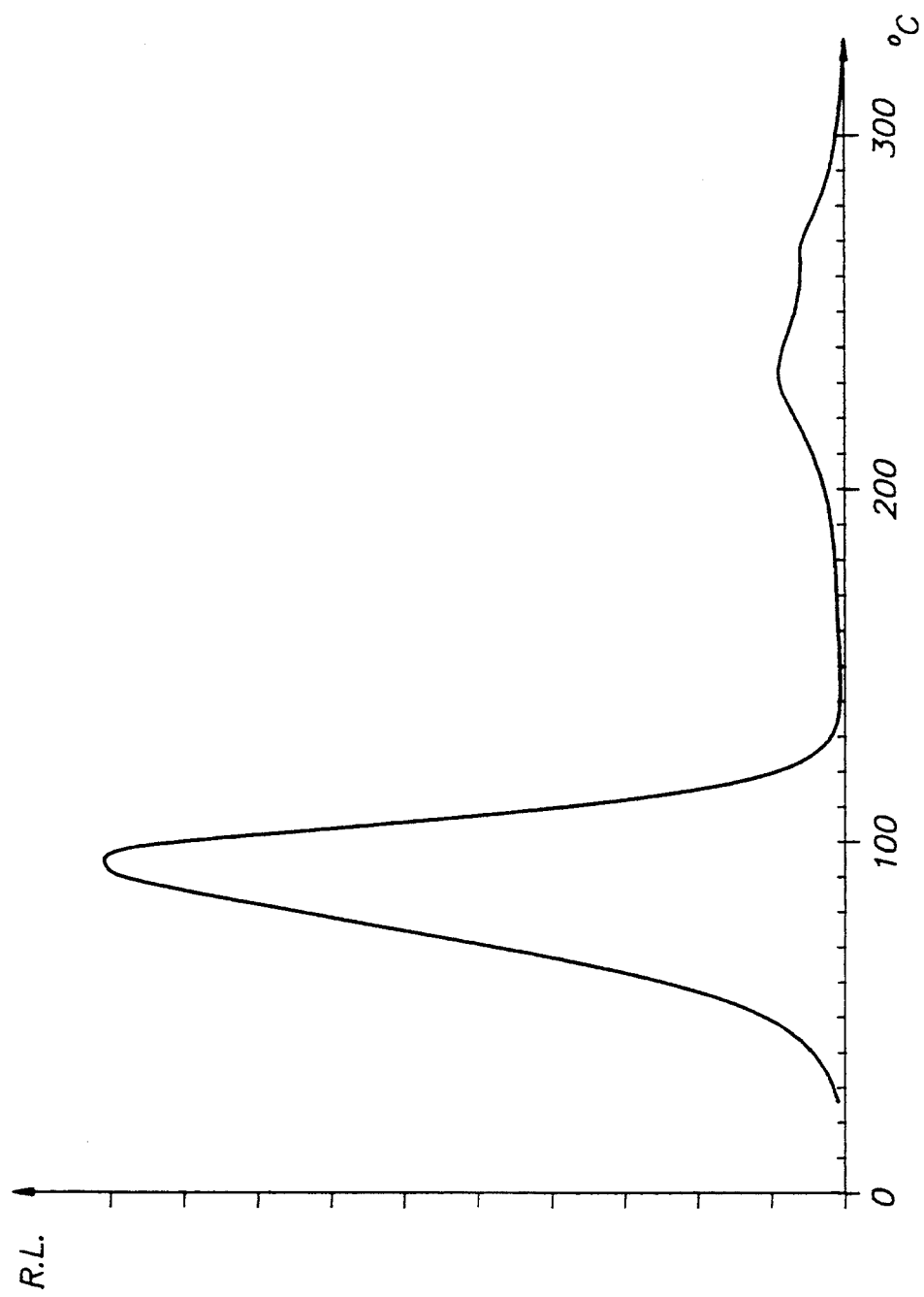
Figure 5:
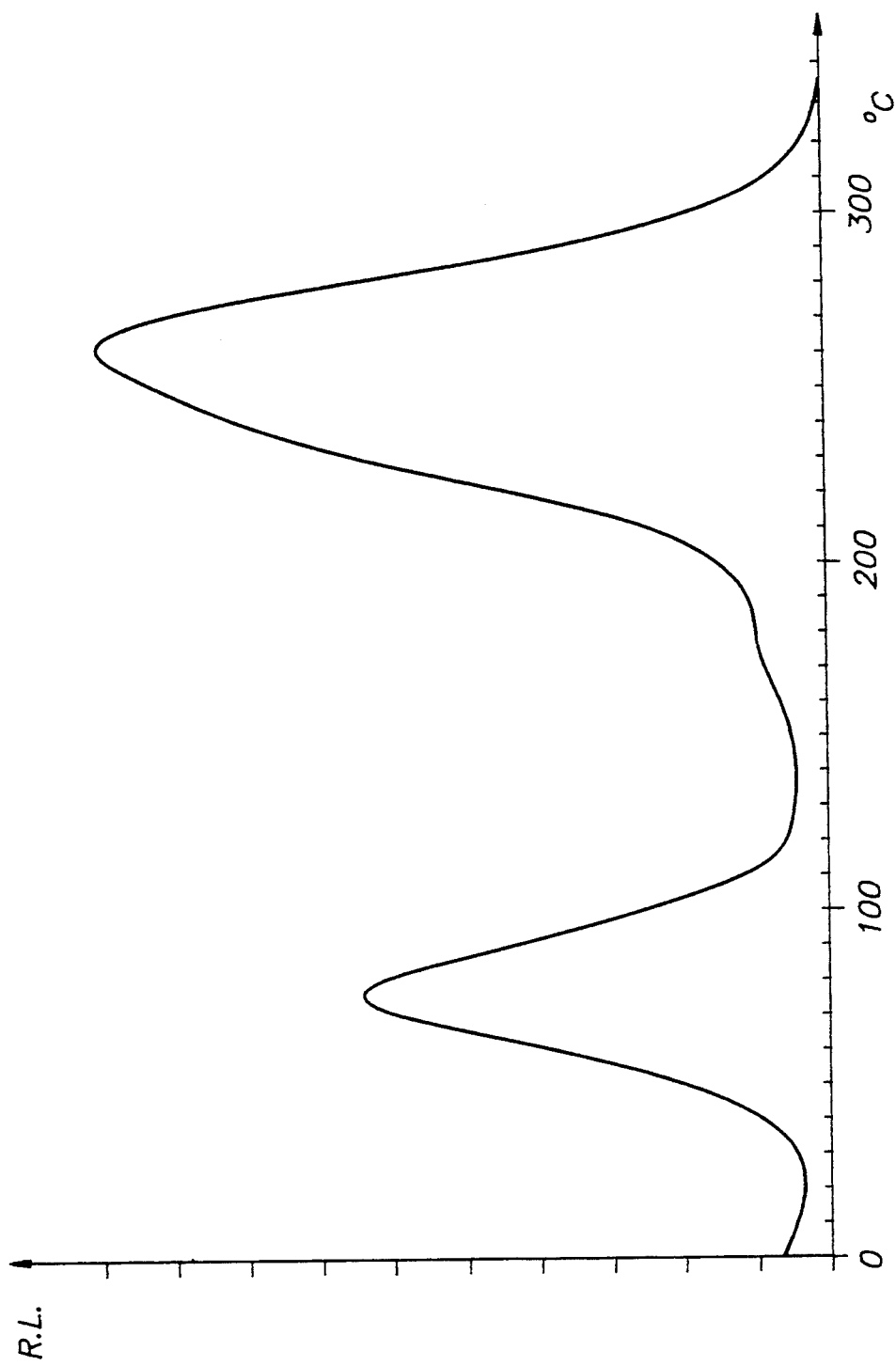

FIGS. 3–5 represent the graphs (glow curves) related to the thermoluminescence measured on the invention phosphors of Examples 2-4, the phosphor of Example 2 being codoped with La$^{3+}$, the phosphor of Example 3 being codoped with y$^{3+}$, and the phosphor of Example 4 being codoped with Lu$^{3+}$. In these graphs the relative intensity of luminance (R.L.) of the thermally stimulated fluorescent light emission is plotted as a function of temperature (°C.).

EXAMPLE 1 (comparative example)

A raw mix of BaCO$_3$, (NH$_4$)$_2$HPO$_4$ and Eu$_2$O$_3$ was prepared wherein the molar ratio of (NH$_4$)$_2$HPO$_4$ to BaCO$_3$ was 1.05 to 1, such to compensate for the partial evaporation of (NH$_4$)$_2$HPO$_4$ during the firing. The molar concentration (atom fraction value) of Eu expressed in % with respect to Ba was 0.1 %.

Mixing and Firing

The mixing of the above ingredients was carried out in a ball mill. The obtained powder mixture was placed in an alumina crucible in an oven and kept in a first firing at 500° C. for 16 hours. After grinding the powder was refired at 800° C. for 6 hours. Both firings were performed in nitrogen atmosphere. A final firing was executed at 900° C. for 20 hours in an atmosphere of 95% by volume of N$_2$ and 5% by volume of H$_2$. The cooled down sample was ground in a mortar.

From the obtained sample the glow-curve was determined and the relative luminescence intensity was plotted versus temperature expressed in centigrades (°C.). That glow curve is shown in FIG. 2.

For determining the conversion efficiency the phosphor was first dispersed in a binder solution containing polyethylacrylate dissolved in ethyl acetate. The dispersion obtained was coated onto a 100 um thick transparent sheet of polyethylene terephthalate to give a coating weight of 500 g/m2. This screen was then used to determine the energy storage characteristics of the phosphor. After erasing any residual stored energy by exposure to a frequency doubled Nd:YAG laser light (532 nm), the screen was irradiated with a given dose of X-rays and then stimulated with either 488 nm or 514 nm light of argon ion laser, 532 nm light of frequency doubled Nd:YAG laser or 633 nm light of Ne-Ne laser.

The emission intensity was too low to be measurable with the experimental set-up described hereinbefore.

EXAMPLES 2-6 (invention examples)

To the raw mix prepared as described in Example 1, 0.1 mole % of La with respect to the Ba-concentration was added in the form of La$_2$O$_3$ to prepare the Example 2 material; 0.1 mole % of Y with respect to the Ba-concentration was added in the form of Y$_2$O$_3$ to prepare the Example 3 material, 0.1 mole % of Lu with respect to the Ba-concentration was added in the form of Lu$_2$O$_3$ to prepare the Example 4 material, 0.1 mole % of Gd with respect to the Ba-concentration was added in the form of Gd$_2$O$_3$ to prepare the Example 5 material, and 0.1 mole % of Zr with respect to the Ba-concentration was added in the form of ZrO$_2$ to prepare the Example 6 material. The firing of said samples proceeded as described in Example 1.

The procedure for determining the glow-curve and conversion efficiency of the cooled down and ground samples was the same as described in Example 1.

The emission intensity upon thermal stimulation, particularly at about 60° C., is higher for the invention phosphors co-doped respectively with lanthanum, yttrium, lutetium, gadolinium or zirconium than for the prior art phosphor solely doped with europium. The low-temperature peak (at about 60° C.) is almost absent in the prior art phosphor. Since the intensity of thermoluminescence is directly proportional to storage capacity the improvement of the phosphor according to the present invention is clearly demonstrated.

The conversion efficiencies (C.E.) expressed in pJ/mm$^3$/m/R of said phosphors prepared according to examples 2-6 and photostimulated respectively with light of wavelengths 488, 514, 532 and 633 nm are given in the following Table.

TABLE

| Example | C.E. (488 nm) | C.E. (514 nm) | C.E. (532 nm) | C.E. (633 nm) |
|---|---|---|---|---|
| 2 | 5.5 | 5.1 | 5.4 | 8.2 |
| 3 | 2.5 | 2.9 | 2.3 | 3.5 |
| 4 | 0.13 | 0.13 | 0.19 | 0.06 |
| 5 | 7.63 | — | — | 0.01 |
| 6 | 4.71 | — | — | 0.00 |

From the C.E. data in said Table and the kind of codopant used may be concluded that the conversion efficiency of the codoped phosphors is inversely proportional to the size of the trivalent codopant cation.

Although with the smallest cation (Lu$^{3+}$) the smallest C.E. value is obtained, but it has been proved to be still several orders of magnitude higher than of the phosphor material doped solely with Eu$^{2+}$. Such is in agreement with the thermoluminescence illustrated by the glow curves shown in FIGS. 2 to 5, wherein FIG. 2 represents th glow curve of the solely Eu$^{2+}$doped phosphor material and FIG. 3-5 represent the glow curves of the invention phosphors codoped respectively with La$^{3+}$, y$^{3+}$or Lu$^{3+}$.

The co-dopants Gd$^{3+}$and Zr$^{4+}$provide excellent photostimulability with argon ion laser light of 488 nm, but much less efficient stimulability with He-Ne laser light of 633 nm.

We claim:
1. A method for recording and reproducing an X-ray image which method comprises the steps of:
   (1) causing a photostimulable phosphor to absorb image-wise or pattern-wise modulated X-rays,
   (2) photostimulating said phosphor with visible light in the wavelength range of 488 to 532 nm to release from the phosphor in accordance with the absorbed X-rays electromagnetic radiation different in wavelength characteristic from the radiation used in the photo-stimulation, and
   (3) detecting said electromagnetic radiation emitted by photostimulation, wherein said phosphor is within the scope of the following formula (I):

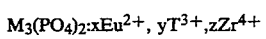

$$M_3(PO_4)_2:xEu^{2+}, yT^{3+}, zZr^{4+}$$

wherein:

M represents Ba and/or Sr, x corresponds with an atom fraction value $10^{-4} \leq x \leq 10^{-1}$, y corresponds with an atom fraction value $10^{-4} \leq y \leq 10^{-1}$, T$^{3+}$is a member selected from the group consisting of La$^{3+}$, Lu$^{3+}$, y$^{3+}$and Gd$^{3+}$, z corresponds with an atom fraction value $10^{-4} \leq z \leq 10^{-1}$, and $5 \times 10^{-5} \leq z+y \leq 10^{-1}$.

2. Method according to claim 1 wherein the photostimulation proceeds with 488 or 514 nm light of an argon ion laser or 532 nm light of a frequency doubled Nd:YAG laser.

* * * * *